United States Patent
Ding et al.

(10) Patent No.: US 9,264,859 B2
(45) Date of Patent: Feb. 16, 2016

(54) COMMUNICATION DEVICE HAVING AUTOMATIC REPLY FUNCTION AND METHOD FOR PERFORMING AUTOMATIC REPLY THEREOF

(71) Applicants: Inventec Appliances (Pudong) Corporation, Shanghai (CN); INVENTEC APPLIANCES (SHANGHAI) CO., LTD., Shanghai (CN); Inventec Appliances (Nanchang) Corporation, Jiangxi (CN)

(72) Inventors: Jianpeng Ding, Jiangxi (CN); Zhan-Ping Liu, Jiangxi (CN)

(73) Assignees: INVENTEC APPLIANCES (PUDONG) CORPORATION, Shanghai (CN); INVENTEC APPLIANCES (SHANGHAI) CO., LTD., Shanghai (CN); INVENTEC APPLIANCES (NANCHANG) CORPORATION, Jiangxi (CN)

( * ) Notice: Subject to any disclaimer, the term of this patent is extended or adjusted under 35 U.S.C. 154(b) by 0 days.

(21) Appl. No.: 14/306,019

(22) Filed: Jun. 16, 2014

(65) Prior Publication Data

US 2015/0018004 A1   Jan. 15, 2015

(30) Foreign Application Priority Data

Jul. 11, 2013   (CN) .......................... 2013 1 0291470

(51) Int. Cl.
 *H04W 4/02* (2009.01)
 *H04W 4/16* (2009.01)
 *H04M 1/725* (2006.01)

(52) U.S. Cl.
 CPC .......... *H04W 4/027* (2013.01); *H04M 1/72577* (2013.01); *H04M 1/72547* (2013.01); *H04M 2250/10* (2013.01); *H04W 4/16* (2013.01)

(58) Field of Classification Search
 None
 See application file for complete search history.

(56) References Cited

U.S. PATENT DOCUMENTS

| | | | |
|---|---|---|---|
| 2008/0153554 A1* | 6/2008 | Yoon ................. | H04M 1/72547 455/567 |
| 2010/0202367 A1* | 8/2010 | Joo ............................... | 370/329 |
| 2010/0273443 A1* | 10/2010 | Forutanpour et al. ...... | 455/404.1 |
| 2011/0195699 A1* | 8/2011 | Tadayon et al. ............... | 455/418 |
| 2013/0203393 A1* | 8/2013 | Bugalia et al. ............. | 455/414.1 |

* cited by examiner

*Primary Examiner* — Daniel Lai
(74) *Attorney, Agent, or Firm* — Muncy, Geissler, Olds & Lowe, P.C.

(57) ABSTRACT

Disclosed is a communication device having an automatic reply function and a method for performing automatic reply thereof. The communication device includes a communication module for receiving a communication request signal; a positioning module for generating positioning information according to a current position of the communication device; a vibration detection module configured to detect a vibration of the communication device to generate a vibration signal; and a processing module. In an interval upon the communication module receiving the communication request signal, the processing module is configured to calculate a velocity of the communication device according to the positioning information and calculate an incidence of vibration of the communication device according to the vibration signal. And the processing module is configured to conduct the communication module transmitting a reply message according to a velocity range corresponding to the calculated velocity and an incidence range corresponding to the calculated incidence.

8 Claims, 3 Drawing Sheets

COMMUNICATION DEVICE HAVING AUTOMATIC REPLY FUNCTION AND METHOD FOR PERFORMING AUTOMATIC REPLY THEREOF

CROSS-REFERENCE TO RELATED APPLICATION

This application claims the benefit of China Patent Application No. 201310291470.3, filed on Jul. 11, 2013, in the State Intellectual Property Office, the disclosure of which is incorporated herein its entirety by reference.

BACKGROUND OF THE INVENTION

1. Field of the Invention

The present invention relates to a communication device and communication a method thereof, in particular with respect to a communication device having an automatic reply function and a method for performing automatic reply thereof.

2. Description of the Related Art

With the technology progression, electronic products are out with the old to make way for the new, especially, those which are fresher, such as the commonly-used smart mobile phones, are more popular to the public.

Smart mobile phone, which is the so-called Smartphone, is regarded as the collective appellation of a cellular phone installed with better operating capability and function than traditional. At present, most people have one or more smart communication products which not only have the common communication function, but also are carry-on and capable of executing works and performing multimedia function.

The existing smartphone is further capable of providing user with various setting modes, such as normal mode, car mode and so on an so forth which enable the user easily taking a phone call while dealing with matters. If the user is unable to answer the phone call, call forwarding function can therefore be set, so that the incoming call will be forwarded to another gadget or voicemail.

Nonetheless, no matter which mode is set, it is a troublesome matter that manual setting is inevitable to the user. The existing call forwarding function can only forward incoming call to another gadget or voicemail, and results that the caller is unable to realize the reason of the unanswered call, and if the incoming call belongs to an important one or is dialed by relative or friend, the caller may worry about the unknown situation.

SUMMARY OF THE INVENTION

In view of the aforementioned defects, an object of the present invention is to provide a communication device having an automatic reply function and a method for performing automatic reply to overcome the shortcomings that the call forwarding function of a current communication device has to be set manually and the device is unable to reply automatically to the caller with the status of the user of the device.

Therefore, the present invention provides a communication device having an automatic reply function which includes a communication module, a positioning module, a vibration detection module, and a processing module. The communication module is for receiving a communication request signal. The positioning module is for generating positioning information according to a current position of the communication device. The vibration detection module is configured to detect a vibration of the communication device to generate a vibration signal. The processing module is coupled to the communication module, the positioning module, and the vibration detection module. In an interval upon the communication module receiving the communication request signal, the processing module is configured to calculate a velocity of the communication device according to the positioning information and calculate an incidence of vibration of the communication device according to the vibration signal. And the processing module is configured to conduct the communication module transmitting a reply message according to a velocity range corresponding to the calculated velocity and an incidence range corresponding to the calculated incidence.

Preferably, the communication device may further comprise a storage module connected to the processing module for storing a plurality of the velocity ranges, a plurality of the incidence ranges, and a plurality of the reply messages.

Preferably, the communication device may further comprise a setting module connected to processing module to enable a user to set a plurality of the velocity ranges, a plurality of the incidence ranges, and a plurality of the reply messages.

Preferably, the processing module may be configured to examine a plurality of the positioning information respectively at times in the time interval and to calculate the velocity based on a distance of movement of the communication device derived from the examined plurality of positioning information between any two of the examination times.

Preferably, the processing module may be configured for not performing the reply function if it's determined that the calculated velocity is smaller than a reference value.

Preferably, the vibration detection module may include a gyroscope.

The present invention also provides a method for performing automatic reply, applicable to a communication device including a communication module and a processing module. The method includes the following steps: the communication module receiving a communication request signal; generating positioning information according to a current position of the communication device; detecting a vibration of the communication device to generate a vibration signal; in an interval upon the communication module receiving the communication request signal, the processing module conducting calculating a velocity of the communication device according to the positioning information and calculating an incidence of vibration of the communication device according to the vibration signal; and the communication module transmitting a reply message according to a velocity range corresponding to the calculated velocity and an incidence range corresponding the calculated incidence.

Preferably, the communication device may further include a storage module, and the method may further comprise: storing a plurality of the velocity ranges, a plurality of the incidence ranges, and a plurality of the reply messages by the storage module.

Preferably, the step of the processing module conducting calculating the velocity may further comprise: the processing module examining a plurality of the positing information respectively at times in the time interval and calculating the velocity based on a distance of movement of the communication device derived from the examined plurality of positioning information between any two of the examination times.

Preferably, the step of the communication module transmitting the reply message may be performed when the calculated velocity is smaller than a reference value.

In summary, a communication device having an automatic reply function and a method for performing automatic reply thereof of the present invention is applicable for determining user's current state according to moving speed and incidence of vibration of the communication device, so as to reply the relevant messages automatically, for example, while the user is driving, meeting with another, doing exercise and so on to notify the caller selectively without switching the setting manually. That not only helps the user, but also informs the caller of the user's state.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
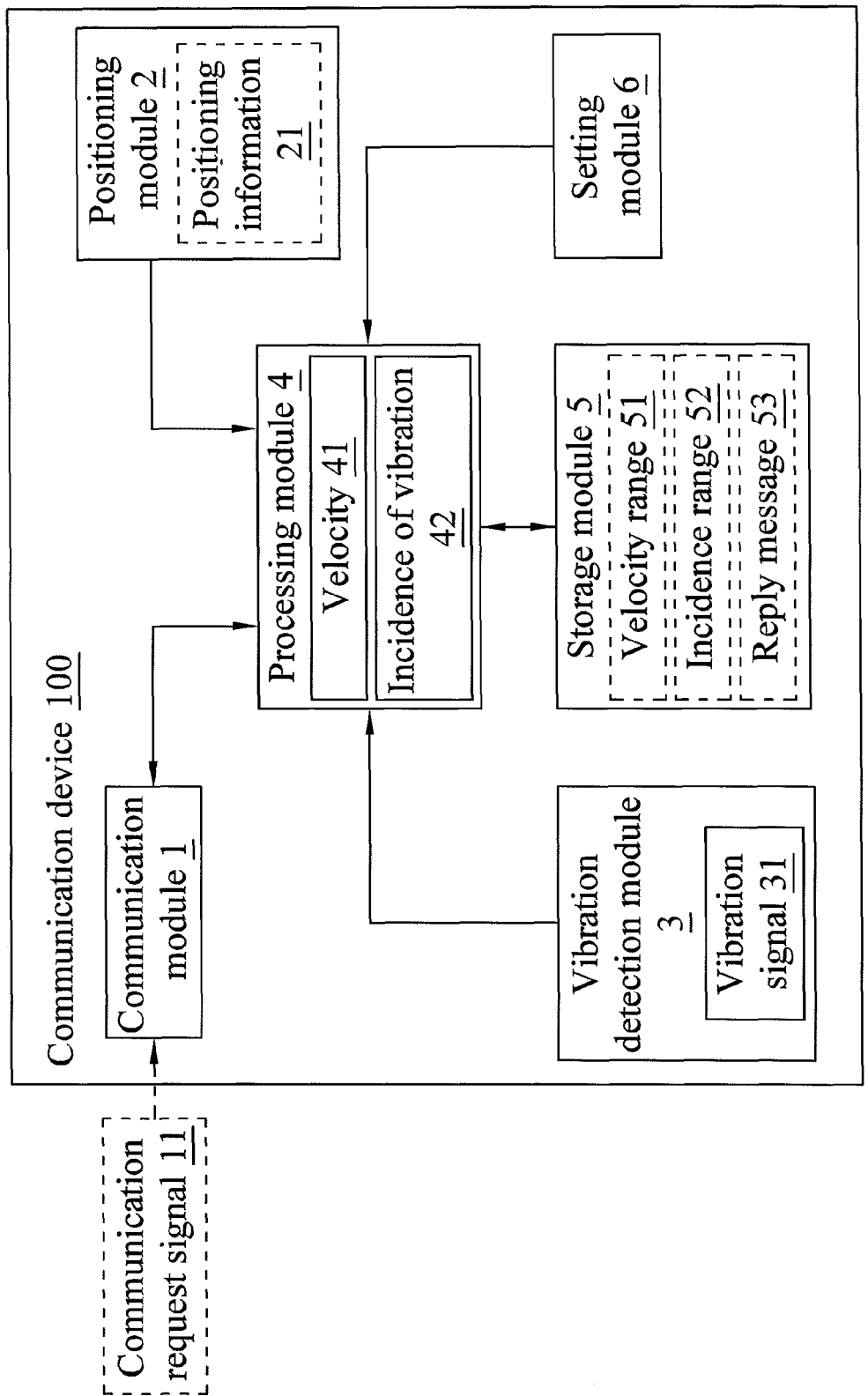
FIG. 1 is a block diagram of a communication device having an automatic reply function of the present invention.

Please with reference to FIG. 1, it is a block diagram of a communication device having an automatic reply function of the present invention. As can be seen in the FIG., a communication device 100 having an automatic reply function comprises a communication module 1, a positioning module 2, a vibration detection module 3, a processing module 4, a storage module 5 and a setting module 6, wherein the processing module 4 couples to the communication module 1, the positioning module 2, the vibration detection module 3, the processing module 4, the storage module 5 and the setting module 6. The communication device 100 may be any type of cellular phones or tablets of internet phone function and so on. The communication module 1 is the Global System for Mobile Communication or VoIP communication protocol. The positioning module 2 is the Global Positioning System (GPS). The vibration detection module 3 comprises a gyroscope. The processing module 4 is a microprocessor. The storage module 5 is a memory or an external memory card and so on. The setting module 6 comprises an input key. The preceding description only belongs to examples and shall not subject to this restriction.

In accordance with the foregoing description, the communication module 1 receives a communication request signal sent by another communication device. The positioning module 2 generates positioning information 21 according to a current position of the communication device 100. The vibration detection module 3 is configured to detect a vibration of the communication device 100 to generate a vibration signal 31. The storage module 5 is connected to the processing module 4 for storing a plurality of the velocity ranges 51, a plurality of the incidence ranges 52, and a plurality of the reply messages 53 set by user. After the setting is completed, one of the reply messages 53 corresponds to one of the velocity ranges 51 and one of the incidence ranges 52, wherein the settings of the above plurality of the velocity ranges 51, the plurality of the incidence ranges 52 and the plurality of the reply messages 53 are executed by the user via the setting module 6.

In accordance with the foregoing description, when the communication device 100 receives an incoming call indication, that is to say, in an interval upon the communication module 1 receives the communication request signal 11, the processing module 4 is configured to calculate a velocity 41 of the communication device 100 according to the positioning information 21 and calculate an incidence (or the number, of times) of vibration 42 of the communication device 1 according to the vibration detection signal 31. Wherein, the velocity 41 is calculated according to that the processing module 4 is configured to sample a plurality of the positioning information 21 respectively at times in the time interval and to calculate the velocity based on a distance of movement of the communication device 100 derived from the examined plurality of positioning information 21 between any two of the examination times. When the processing module 4 determines that the velocity 41 is bigger than a reference value, the processing module 4 is configured to conduct the communication module 1 transmitting a reply message to another communication device according to the velocity range 51 corresponding to the calculated velocity 41 and an incidence range 52 corresponding to the calculated incidence 42. The processing module 4 is configured for not performing the reply function if it's determined that the calculated velocity 41 is smaller than a reference value.

Figure 2:
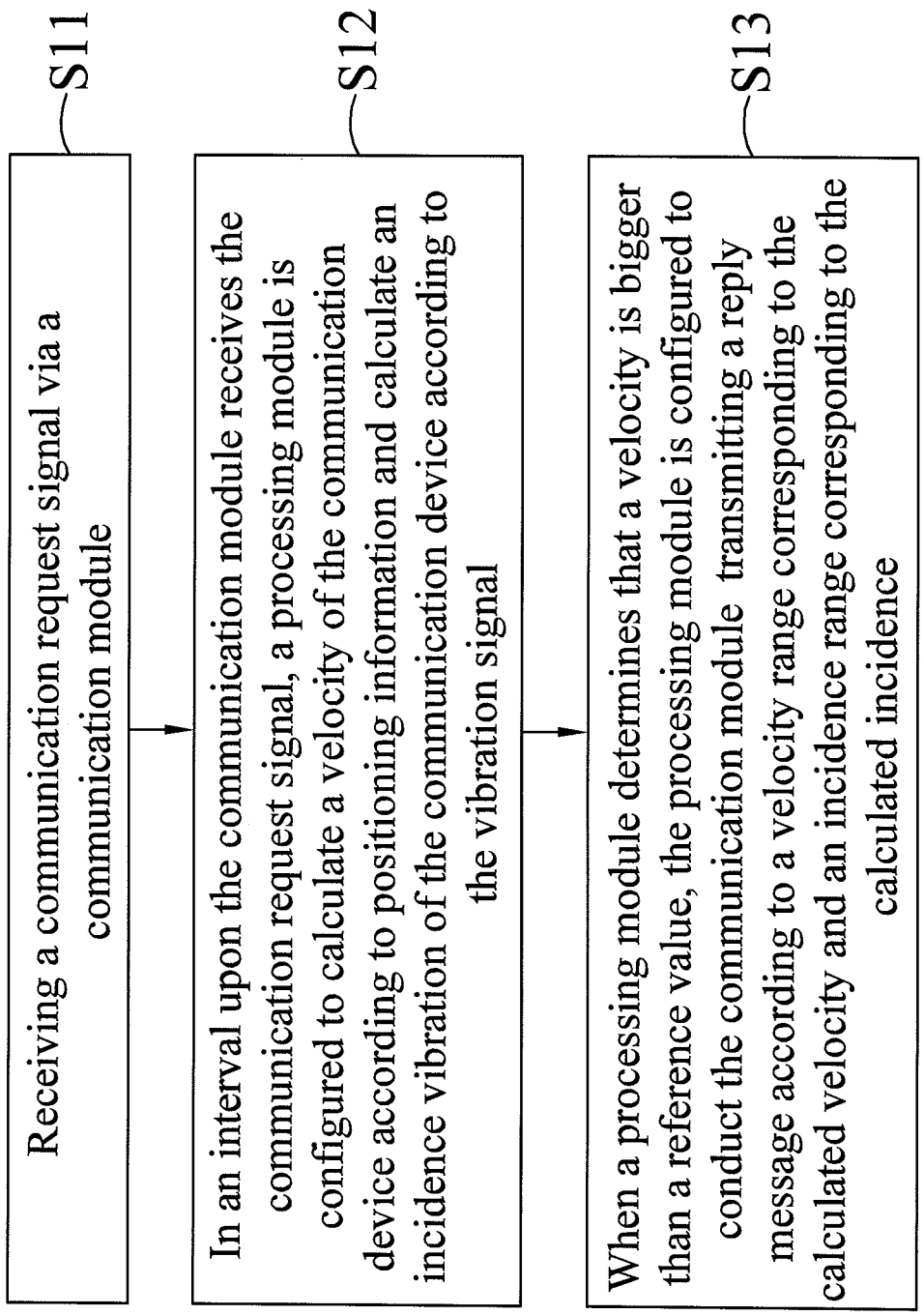
FIG. 2 is a flow chart of a method for performing automatic reply of the present invention.

Please with reference to FIG. 2, it is a flow chart of a method for performing automatic reply of the present invention, the method for performing automatic reply is applicable to the communication device 100, and the method comprises the following steps:

Step 11: Receiving a communication request signal via a communication module.

Step 12: In an interval upon the communication module receives the communication request signal, a processing module is configured to calculate a velocity of the communication device according to positioning information and calculate an incidence of vibration of the communication device according to the vibration signal.

Step 13: When a processing module determines that a velocity is bigger than a reference value, the processing module is configured to conduct the communication module transmitting a reply message according to a velocity range corresponding to the calculated velocity and an incidence range corresponding to the calculated incidence.

Figure 3:
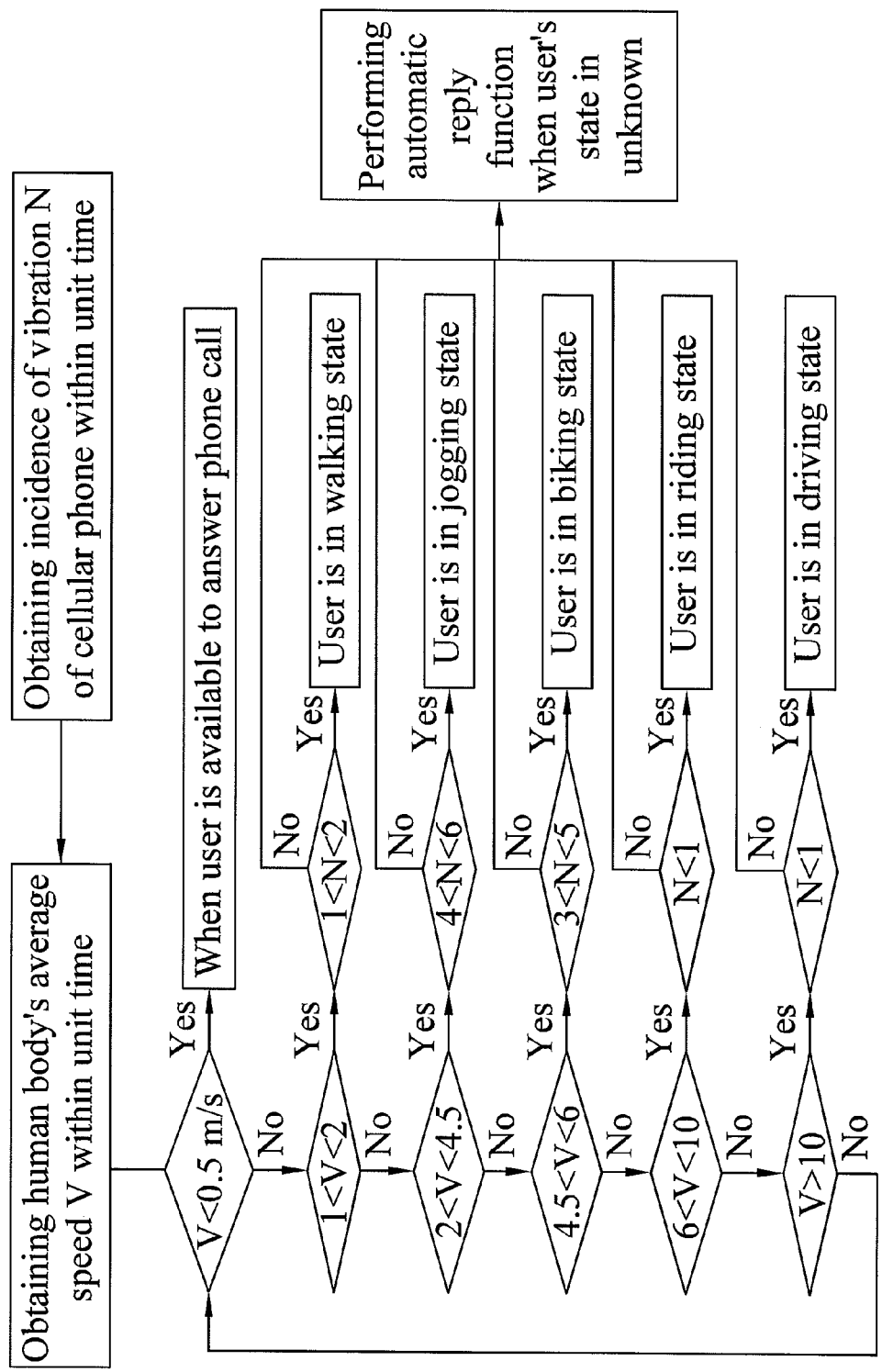
FIG. 3 is a schematic diagram of an embodiment of a communication device having an automatic reply function and a method for performing automatic reply thereof of the present invention.

Please with reference to FIG. 3, it is a schematic diagram of an embodiment of a communication device having an automatic reply function and a method for performing automatic reply thereof of the present invention. The present invention mainly positions user's initial position (longitude and latitude) by GPS, and conducts scanning the user's current position via a specific frequency, so as to obtain the user's motion trace; and within a specific time T, to calculate the sum S of distance of motion and thereby to obtain the user's current average motion speed V=S/T via the calculation. In the meanwhile, the present invention obtains an incidence (or the number of times) of vibration N within a unit time by a gyroscope. The speed V and the incidence of vibration N of a cellular phone are not the same while the user is in different movement state, but the current moving state of the user can be determined by sampling and analyzing the data V and N. As can be seen in FIG. 3:

(1) Not performing the automatic reply function if it is determined that the user is not in movement state which indicates that the user is available to answer phone call when the average speed V is smaller 0.5 m/s (speed threshold value) and the incidence of vibration N of the cellular phone are an indefinite value.

(2) Performing the automatic reply the "in walking state" if it is determined that the user is walking when the average speed V is bigger than 0.5 m/s (speed threshold value), falling in the range of 1 m/s-2 m/s (velocity range) and the incidence of vibration N of the cellular phone are about 1-2 times per second (incidence range).

(3) Performing the automatic reply the "in jogging state" if it is determined that the user is jogging when the average speed V is bigger than 0.5 m/s (speed threshold value), falling in the range of 2 m/s-4.5 m/s (velocity range) and the incidence of vibration N of the cellular phone are about 4-6 times per second (incidence range).

(4) Performing the automatic reply the "in biking state" if it is determined that the user is biking when the average speed V is bigger than 0.5 m/s (speed threshold value), falling in the range of 4.5 m/s-6 m/s (velocity range) and the incidence of vibration N of the cellular phone are about 3-6 times per second (incidence range).

(5) Performing the automatic reply the "in riding state" if it is determined that the user is riding when the average speed V is bigger than 0.5 m/s (speed threshold value), falling in the range of 6 m/s-10 m/s (velocity range) and the incidence of vibration N of the cellular phone are less than one time per second (incidence range).

(6) Performing the automatic reply the "in driving state" if it is determined that the user is driving when the average speed V is bigger than 0.5 m/s (speed threshold value) and bigger than 10 m/s (velocity range) and the incidence of vibration N of the cellular phone are less than one time per second (incidence range).

In accordance with the foregoing description, the automatic reply is performed while the motion speed V is matched and the incidence of vibration N are unmatched.

In conclusion, a communication device having an automatic reply function and a method for performing automatic reply thereof of the present invention employs motion speed and incidence of vibration of cellular phone to determine user's state, so as to perform an automatic reply function to notify the caller and therefor it is of convenience and practicability.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A communication device having an automatic reply function, comprising:
    a communication module for receiving a communication request signal;
    a positioning module for generating positioning information according to a current position of the communication device;
    a vibration detection module, configured to detect a vibration of the communication device to generate a vibration signal;
    a processing module, coupled to the communication module, the positioning module, and the vibration detection module, wherein in an interval upon the communication module receiving the communication request signal, the processing module is configured to calculate a velocity of the communication device according to the positioning information and calculate an incidence of vibration of the communication device according to the vibration signal; and the processing module is configured to conduct the communication module transmitting a reply message according to a velocity range corresponding to the calculated velocity and an incidence range corresponding to the calculated incidence; and
    a storage module connected to the processing module for storing a plurality of the velocity ranges, a plurality of the incidence ranges, and a plurality of the reply messages.

2. The communication device of claim 1, further comprising a setting module connected to processing module to enable a user to set a plurality of the velocity ranges, a plurality of the incidence ranges, and a plurality of the reply messages.

3. The communication device of claim 1, wherein the processing module is configured to examine a plurality of the positioning information respectively at times in the time interval and to calculate the velocity based on a distance of movement of the communication device derived from the examined plurality of positioning information between any two of the examination times.

4. The communication device of claim 1, wherein the processing module is configured for not performing the reply function if it's determined that the calculated velocity is smaller than a reference value.

5. The communication device of claim 1, wherein the vibration detection module comprises a gyroscope.

6. A method for performing automatic reply, applicable to a communication device comprising a communication module and a processing module, the method comprising the following steps:
    the communication module receiving a communication request signal;
    generating positioning information according to a current position of the communication device;
    detecting a vibration of the communication device to generate a vibration signal;
    in an interval upon the communication module receiving the communication request signal, the processing module conducting calculating a velocity of the communication device according to the positioning information and calculating an incidence of vibration of the communication device according to the vibration signal; and
    the communication module transmitting a reply message according to a velocity range corresponding to the calculated velocity and an incidence range corresponding the calculated incidence;
    wherein the communication device further comprises a storage module, and the method further comprises:
    storing a plurality of the velocity ranges, a plurality of the incidence ranges, and a plurality of the reply messages by the storage module.

7. The method of claim 6, wherein the step of the processing module conducting calculating the velocity further comprises:
    the processing module examining a plurality of the positing information respectively at times in the time interval and calculating the velocity based on a distance of movement of the communication device derived from the examined plurality of positioning information between any two of the examination times.

8. The method of claim 6, wherein the step of the communication module transmitting the reply message is performed when the calculated velocity is smaller than a reference value.

* * * * *